March 2, 1954 — M. B. STEINTHAL — 2,670,844
SAMPLE HOLDER AND DISPLAY DEVICE
Filed March 23, 1953 — 2 Sheets-Sheet 1
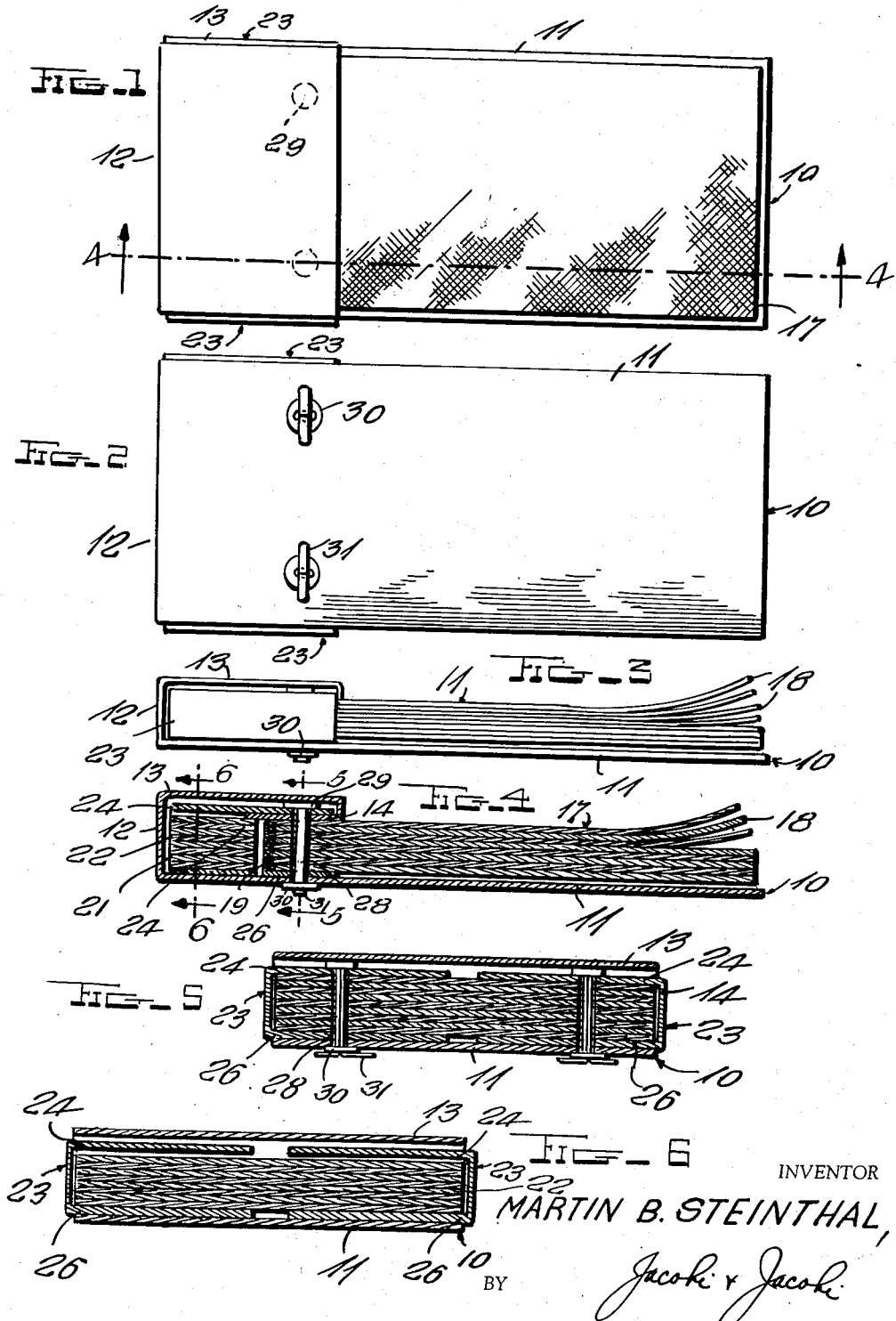
INVENTOR
MARTIN B. STEINTHAL
BY Jacobi & Jacobi
ATTORNEYS March 2, 1954 M. B. STEINTHAL 2,670,844
SAMPLE HOLDER AND DISPLAY DEVICE
Filed March 23, 1953 2 Sheets-Sheet 2
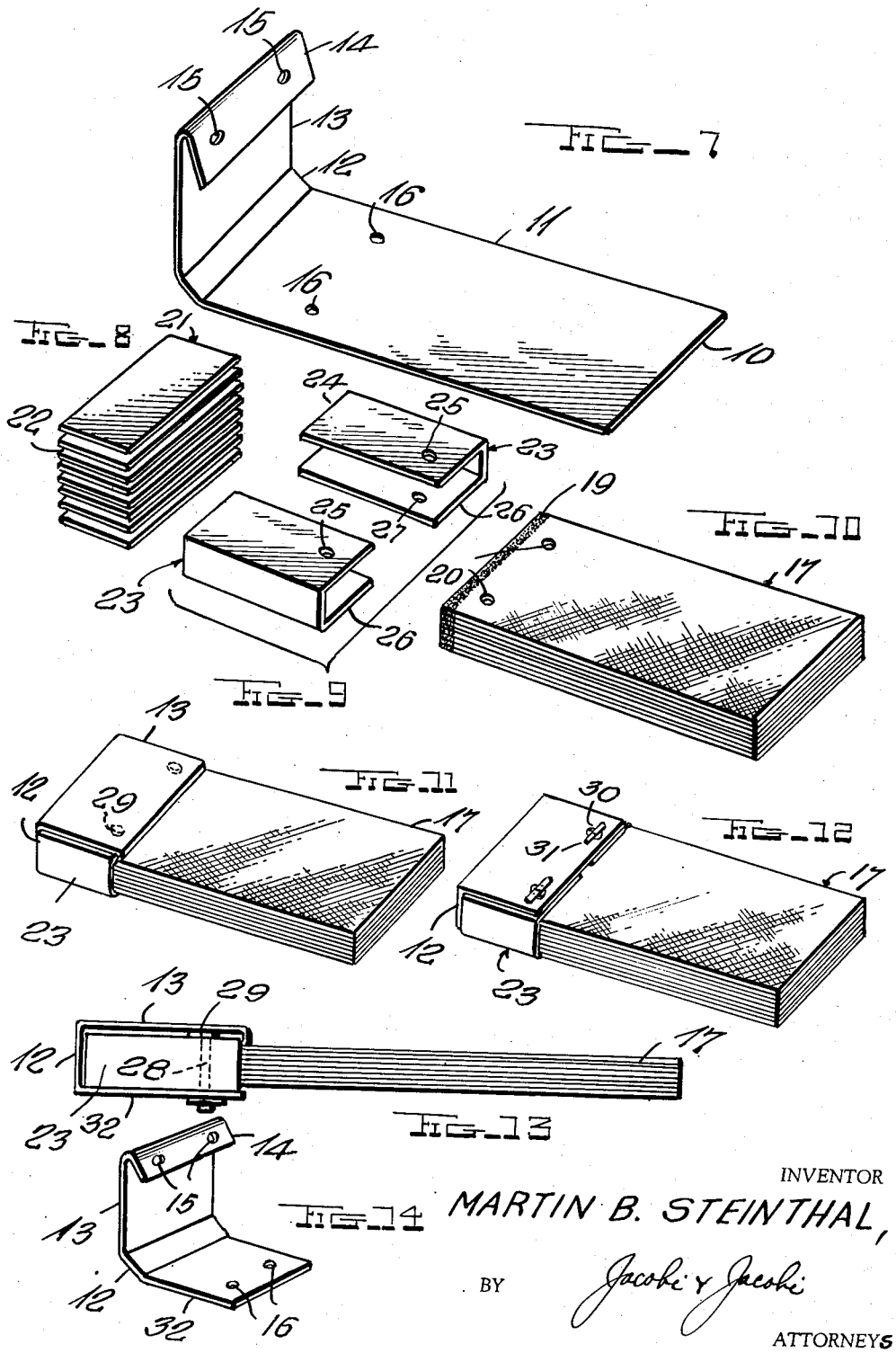
INVENTOR
MARTIN B. STEINTHAL,
BY Jacobi & Jacobi
ATTORNEYS Patented Mar. 2, 1954

2,670,844

UNITED STATES PATENT OFFICE 2,670,844

SAMPLE HOLDER AND DISPLAY DEVICE

Martin B. Steinthal, New York, N. Y.

Application March 23, 1953, Serial No. 344,161

10 Claims. (Cl. 206—82)

This invention relates to merchandising and more particularly to a device for holding and displaying swatches or samples of material to be sold, such as fabrics or the like.

The device of this invention is intended primarily to hold a stack of swatches or samples in book form in such a manner as to conveniently and attractively display the same, and at the same time, prevent inadvertent damage thereto. The device is further intended, with slight modification, to accommodate samples of different sizes without the necessity of forming all of the parts of the device to different dimensions.

It is accordingly an object of this invention to provide a sample holder and display device which may be economically constructed of readily available material, such as cardboard or the like, by relatively simple die-cutting operations.

A further object of the invention is the provision of a sample holder and display device which serves to clamp a stack of samples in book form and to provide a backing for such stack.

A still further object of the invention is the provision of a sample holder and display device in which only a relatively small portion of the samples need be covered for fastening purposes, filler pieces being provided to occupy any excess space within the clamping portions of the device.

Another object of the invention is the provision of a sample holder and display device in which side members are provided for concealing the relatively unsightly bound ends of the samples.

A further object of the invention is the provision of a sample holder and display device in which only a binding is provided for one end of the stack of samples, any backing member being eliminated.

Another object of the invention is the provision of a sample holder and display device in which the samples in the stack are bonded together at one end by an adhesive.

Further objects and advantages of the invention will be apparent from the following description taken in conjunction with the accompanying drawings wherein:

Fig. 1 is a top plan view of the sample holder and display device of this invention;

Fig. 2, a bottom plan view of the device shown in Fig. 1;

Fig. 3, a side elevational view of the device shown in Fig. 1;

Fig. 4, a sectional view on the line 4—4 of Fig. 1;

Fig. 5, a sectional view on the line 5—5 of Fig. 4;

Fig. 6, a sectional view on the line 6—6 of Fig. 4;

Fig. 7, a perspective view showing the base member of the device;

Fig. 8, a perspective view showing the filler pieces;

Fig. 9, an exploded perspective view showing the side members;

Fig. 10, a perspective view showing a stack of samples or swatches to be clamped in the device of this invention;

Fig. 11, a perspective view of a modified form of the invention showing the upper side thereof;

Fig. 12, a perspective view of the device of Fig. 11, showing the lower side thereof;

Fig. 13, a side elevational view of the device of Fig. 11; and

Fig. 14, a pesrspective view of the base member utilized with the device of Fig. 11.

With continued reference to the drawing a base member 10 of substantially rectangular elongated form provides a back member 11 which is turned upwardly at one end to form an end wall 12. End wall 12 adjacent the upper edge thereof is bent forwardly to provide a relatively short cover portion 13 overlying the backing member 11, the forward edge of the cover portion 13 being bent rearwardly in underlying relationship to the cover portion 13 to provide a relatively short clamping portion 14. Spaced apertures 15 are provided in the clamping portion 14 and these are disposed in alignment with apertures 16 provided in the backing member 11 when the cover portion 13 occupies the position shown in Figs. 1 to 6 inclusive.

A stack 17 of individual samples 18 which may comprise swatches or pieces of material such as fabrics to be displayed may have such individual pieces 18 bonded together at one end by a suitable adhesive 19 to provide a stack 17 in the nature of a pad. If desired, the stack 17 may be provided with apertures 20 spaced for alignment with the apertures 15 and 16 in clamping portion 14 and the backing member 11. Where the material of the samples 18 is relatively soft, it is not necessary to provide the apertures 20, since the fasteners, to be later described, may be forced through the material of the samples 18.

As best shown in Fig. 4, the stack 17 of samples 18 is positioned on the upper surface of the backing member 11 with the apertures 20 in alignment with the apertures 16. In this position it is clearly evident that the inner end of the stack 17 projects only a relatively short distance within the channel formed by the cover portion 13 and the backing member 11. In order to fill the additional or excess space beyond the end of the stack 17 and prevent collapse of the cover portion 13 a stack 21 of individual filler pieces 22 may be disposed in this space. Each filler piece is of substantially the same length and thickness as the width and thickness of each sample 18.

In order to retain the stack 21 of filler pieces 22 in position and in order to conceal the inner bonded ends of the samples 18, side members 23 may be provided, each side member being of U-shape, one leg 24 of the side member 23 being provided with an aperture 25 and the other leg 26 of the side member 23 being provided with an aperture 27 in alignment with the aperture 25. As will be seen from an inspection of Figs. 4, 5 and 6, the side members 23 are positioned with the legs 24, disposed between the clamping portion 14 and the cover portion 13 and with the legs 26 disposed between the stack 17 of samples 18 and the stack 21 of filler pieces 22 and the upper surface of the backing member 11. The upper legs 24 are also positioned between the cover portion 13 and the upper surface of the stack 21 of filler pieces 22.

In order to securely hold the stack 17 of samples 18 in assembled relationship with the base member 10 and to hold the side members 23 and stack 21 of filler pieces 22 in position, fastening means in the form of split rivets 28 may be employed, these rivets having heads 29, disposed between the clamping portion 14 and cover portion 13 with the shanks of the rivets extending through the apertures 15, 25, 20, 27 and 16. The lower ends of the rivets extend through washers 30 abutting the lower surface of the base member 10 and the ends 31 of the rivets 28 are bent outwardly as best shown in Figs. 2 and 5 to securely clamp the stack 17 of samples 18 between the cover portion 13 and backing member 11.

Obviously with the above described form of the invention the stack 17 of samples 18 may be clamped in position between the cover portion 13 and the backing member 11, by covering only a limited portion of the stack 17 and further it will be obvious, that stacks 17 of various widths may be accommodated merely by providing base members 10 of the appropriate widths, the side members 23 being usable regardless of the particular width of the stack 17 and base member 10. This assembly provides a convenient book-like package which serves to protect and attractively display the samples 18 with the heads 29 of the fastening means invisible from the upper side of the package. Obviously other types of fastening means than the split rivets described may be utilized if desired.

A modified form of the invention is shown in Figs. 11 to 14, the structure thereof being identical with that above described with the exception that the base member 10 terminates immediately below and in the plane of the forward edge of the cover portion 13 to provide a relatively short backing member 32 which serves to conceal the inner end of the samples 18 and the filler pieces 22 but does not provide a backing member underlying the entire stack 17 of samples 18. The manner of assembly and appearance from the upper side of this modified form of the invention is identical with that described above in connection with the preferred form of the invention.

It will be seen that by the above described invention there has been provided a relatively simple and inexpensive sample holder and display device which may be utilized to contain a plurality of samples of flexible material such as fabrics or the like and which serves to display such samples while concealing only a minor portion thereof and likewise serves to protect the same, the display device itself being also formed in such a manner and incorporating filler pieces to preclude damage to the same by crushing or the like. The device also provides for convenient removal of the stack of samples and replacing of the same with other samples without the necessity of using tools or requiring any special skill.

It will be obvious to those skilled in the art that various changes may be made in the invention without departing from the spirit and scope thereof, and therefore the invention is not limited by that which is shown in the drawing and described in the specification, but only as indicated in the appended claims.

What is claimed is:

1. A sample holder and display device comprising a generally rectangular elongated base member bent upwardly at one end to provide an end wall, a relatively short cover portion extending forwardly from the upper edge of said end wall and overlying a part of said base, the forward end of said cover portion being bent backwardly upon itself in underlying relation to provide a sample clamping portion, spaced apertures in said clamping portion, spaced apertures in said base member in alignment with the apertures in said clamping portion, a stack of samples overlying said base member with the inner ends thereof extending between said base member and said clamping portion in spaced relation to said end wall, a stack of filler pieces of substantially the same height and width as said samples disposed between said cover portion and said base and between the inner ends of said samples and said end wall, a U-shaped side member disposed between said cover portion and said base at each side thereof, one leg of said side member being disposed between said clamping portion and said cover portion and the other leg of said side member being disposed between the inner ends of said samples and said filler pieces and said base, apertures in the legs of said side members in alignment with the apertures in said clamping portion and said base and headed fastening means extending through said apertures with the heads thereof disposed between said cover portion and said clamping portion.

2. A sample holder and display device as defined in claim 1 in which said fastening means comprises split rivets with the ends thereof spread over washers disposed on said rivets adjacent the lower surface of said base member.

3. A sample holder and display device as defined in claim 1, in which the samples in said stack are bonded together at their inner ends by an adhesive.

4. A sample holder and display device as defined in claim 1, in which said base member terminates in the same plane as the forward edge of said cover portion.

5. A sample holder and display device comprising a base member bent upwardly at one end to provide an end wall, a relatively short cover portion extending forwardly from the upper edge of said end wall and overlying a part of said base, the forward end of said cover portion being bent backwardly upon itself in underlying relation to provide a sample clamping portion, spaced apertures in said clamping portion, spaced apertures in said base member in alignment with the apertures in said clamping portion, a stack of samples overlying said base member with the inner ends thereof extending between said base member and said clamping portion in spaced relation to said end wall, a stack of filler pieces of substantially the same height and width as said samples disposed between said cover portion and said base and between the inner ends of said samples and said end wall, a U-shaped side member disposed between said cover portion and said base at each side thereof, one leg of said side member being disposed between said clamping portion and said cover portion and the other leg of said side member being disposed between the inner ends of said samples and said filler pieces and said base, apertures in the legs of said side members in alignment with the apertures in said clamping portion and said base and headed fastening means extending through said apertures with the heads thereof disposed between said cover portion and said clamping portion.

6. A sample holder and display device comprising a base member bent upwardly at one end to provide an end wall, a relatively short cover portion extending forwardly from the upper edge of said end wall and overlying a part of said base, the forward end of said cover portion being bent backwardly upon itself in underlying relation to provide a sample clamping portion, spaced apertures in said clamping portion, spaced apertures in said base member in alignment with the apertures in said clamping portion, a stack of samples overlying said base member with the inner ends thereof extending between said base member and said clamping portion in spaced relation to said end wall, a stack of filler pieces disposed between said cover portion and said base and between the inner ends of said samples and said end wall, a U-shaped side member disposed between said cover portion and said base at each side thereof, one leg of said side members being disposed between said clamping portion and said cover portion and the other leg of said side member being disposed between the inner ends of said samples and said filler pieces and said base, apertures in the legs of said side members in alignment with the apertures in said clamping portion and said base and headed fastening means extending through said apertures with the heads thereof disposed between said cover portion and said clamping portion.

7. A sample holder and display device comprising a base member bent upwardly at one end to provide an end wall, a relatively short cover portion extending forwardly from the upper edge of said end wall and overlying a part of said base, the forward end of said cover portion being bent backwardly upon itself in underlying relation to provide a sample clamping portion, a stack of samples overlying said base member with the inner ends thereof extending between said base member and said clamping portion in spaced relation to said end wall, a stack of filler pieces disposed between said cover portion and said base and between the inner ends of said samples and said end wall, a U-shaped side member disposed between said cover portion and said base at each side thereof, one leg of said sidle member being disposed between said clamping portion and said cover portion and the other leg of said side member being disposed between the inner ends of said samples and said filler pieces and said base and headed fastening means extending through said clamping portion, said legs and said base with the heads thereof disposed between said cover portion and said clamping portion.

8. A sample holder and display device comprising a base member bent upwardly at one end to provide an end wall, a relatively short cover portion extending forwardly from the upper edge of said end wall and overlying a part of said base, the forward end of said cover portion being bent backwardly upon itself in underlying relation to provide a sample clamping portion, a stack of samples overlying said base member with the inner ends thereof extending between said base member and said clamping portion in spaced relation to said end wall, a stack of filler pieces disposed between said cover portion and said base and between the inner ends of said samples and said end wall, a U-shaped side member disposed between said cover portion and said base at each side thereof, one leg of said side member being disposed between said clamping portion and said cover portion and the other leg of said side member being disposed between the inner ends of said samples and said filler pieces and said base and fastening means for securing said stack in said holder.

9. A sample holder and display device as defined in claim 8, in which each filler piece is of substantially the same thickness as each sample.

10. A sample holder and display device comprising a base member bent upwardly at one end to provide an end wall, a relatively short cover portion extending forwardly from the upper edge of said end wall and overlying a part of said base, the forward end of said cover portion being bent backwardly upon itself in underlying relation to provide a sample clamping portion, a stack of samples overlying in said base member with the inner ends thereof extending between said base member and said clamping portion in spaced relation to said end wall, a U-shaped side member disposed between said cover portion and said base at each side thereof, one leg of said side member being disposed between said clamping portion and said cover portion and the other leg of said side member being disposed between the inner ends of said samples and said base and fastening means for securing said stack in said holder.

MARTIN B. STEINTHAL.

References Cited in the file of this patent

UNITED STATES PATENTS

| Number | Name | Date |
| --- | --- | --- |
| 634,673 | Ruda | Oct. 10, 1899 |
| 687,437 | Reynolds et al. | Nov. 26, 1901 |
| 1,009,839 | Scheid | Dec. 7, 1926 |
| 1,958,067 | Pullen | May 8, 1934 |
| 2,120,818 | Steinthal | June 14, 1938 |
| 2,141,461 | Cahn | Dec. 27, 1938 |
| 2,558,996 | Ullmann | July 3, 1951 |
| 2,576,262 | Morehead | Nov. 27, 1951 |

FOREIGN PATENTS

| Number | Country | Date |
| --- | --- | --- |
| 5,042 of 1903 | Great Britain | Jan. 7, 1904 |